UNITED STATES PATENT OFFICE.

CLEMENS ZÖLLNER, OF CHARLOTTENBURG, GERMANY, ASSIGNOR TO CHEMISCHE FABRIK AUF ACTIEN (VORM. E. SCHERING), OF BERLIN, GERMANY.

GLYCOLIC ACID ESTERS OF 2-PHENYLQUINOLIN-4-CARBOXYLIC ACID.

1,086,881.  Specification of Letters Patent.  Patented Feb. 10, 1914.

No Drawing.  Application filed August 13, 1913. Serial No. 784,621.

*To all whom it may concern:*

Be it known that I, CLEMENS ZÖLLNER, doctor of philosophy, chemist, citizen of the German Empire, residing at Charlottenburg, near Berlin, German Empire, have invented a new and useful Improvement in Glycolic Acid Esters of 2-Phenylquinolin-4-Carboxylic Acid, of which the following is a specification.

The subject matter of this invention is the hitherto unknown glycolic acid esters of 2-phenylquinolin-4-carboxylic acid of the general formula

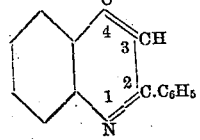

in which R is an alcoholic radical. The new compounds are insoluble in water, soluble in the usual organic solvents, are nearly tasteless, and are useful as remedies in gout and rheumatism etc.

The process for the production of the new compounds consists in causing a halogen-acetic ester to react upon a salt of the 2-phenylquinolin-4-carboxylic acid.

In order to illustrate my invention, the following examples are given, the parts being by weight:

1. Molecular quantities of the sodium salt of phenylquinolin carboxylic acid and the ethyl ester of chloroacetic acid are dissolved in alcohol and heated under pressure for from four to five hours to about 120 centigrade. The filtrate from the precipitated sodium chlorid is evaporated and fractionated *in vacuo* the alcoholic and chloroacetic ester residues passing over first. Above 250 centigrade at a pressure of 15 millimeters the 2 phenylquinolin-4-carboxylic acid-glycolic acid ethylester passes over as a clear slightly yellow oil having a pleasant aromatic odor. The ester is soluble in alcohol, ether, chloroform, acetone and in olive oil and can be employed as a liniment either directly or when suitably diluted. The oil can be brought to a crystalline state by the addition of a few crystals and the crystals obtained melt at 60 centigrade which can again be rendered fluid by heating.

2. 20.4 parts of the sodium salt of phenylquinolin carboxylic acid in alcoholic solution are heated to 125–135 centigrade together with 17.4 parts of chloroacetic acid menthylester for four hours in a closed tube. After cooling the precipitated sodium chlorid is removed by filtration and from the filtrate the phenylquinolin-carboxylic acid-glycolic acid-menthylester is after distillation of the alcohol obtained as a thick oil soluble in the usual organic solvents.

Other esters are obtained in a similar manner.

I claim as my invention:

1. As new products the glycolic acid esters of 2-phenylquinolin-4-carboxylic acid of the formula

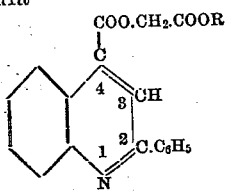

in which R is an alcoholic radical, which products are insoluble in water, soluble in the usual organic solvents, are nearly tasteless and are useful as remedies, substantially as described.

2. The herein described glycolic acid ethylester of 2-phenylquinolin-4-carboxylic acid of the formula

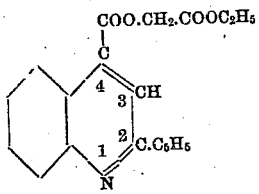

being insoluble in water, soluble in alcohol, ether, chloroform, acetone and in olive oil, substantially as described.

3. The herein described process of producing glycolic acid esters of 2-phenylquinolin-4-carboxylic acid, which consists in causing a halogenacetic ester to react upon a salt of the 2-phenylquinolin-4-carboxylic acid, and isolating the product of reaction, substantially as described.

In testimony whereof I have hereunto set my hand in the presence of two subscribing witnesses.

CLEMENS ZÖLLNER.

Witnesses:
HENRY HASPER,
HARRY L. WILSON.